US012591895B2

(12) United States Patent
Tedesco et al.

(10) Patent No.: US 12,591,895 B2
(45) Date of Patent: Mar. 31, 2026

(54) SYSTEMS AND METHODS FOR MONITORING SERVICES USING SMART CONTRACTS

(71) Applicant: Boost SubscriberCo L.L.C., Englewood, CO (US)

(72) Inventors: Evan Tedesco, Highlands Ranch, CO (US); Christopher Ergen, Littleton, CO (US); Garo Petrosyan, Denver, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 94 days.

(21) Appl. No.: 17/170,632

(22) Filed: Feb. 8, 2021

(65) Prior Publication Data

US 2022/0253866 A1 Aug. 11, 2022

(51) Int. Cl.
| | |
|---|---|
| *G06Q 30/016* | (2023.01) |
| *G06N 5/04* | (2023.01) |
| *G06N 20/00* | (2019.01) |
| *G06Q 10/0639* | (2023.01) |
| *G06Q 10/10* | (2023.01) |
| *G06Q 20/36* | (2012.01) |
| *H04L 65/60* | (2022.01) |

(52) U.S. Cl.
CPC ............. *G06Q 30/016* (2013.01); *G06N 5/04* (2013.01); *G06N 20/00* (2019.01); *G06Q 10/0639* (2013.01); *G06Q 10/10* (2013.01); *G06Q 20/367* (2013.01); *H04L 65/60* (2013.01)

(58) Field of Classification Search
CPC .. G06Q 30/016; G06Q 10/0639; G06Q 10/10; G06Q 20/367; G06N 5/04; G06N 20/00; H04L 65/60
See application file for complete search history.

(56) References Cited

U.S. PATENT DOCUMENTS

| | | | | |
|---|---|---|---|---|
| 10,956,849 B2 * | 3/2021 | Wu | ...................... | H04L 41/5025 |
| 11,042,871 B2 * | 6/2021 | Snow | ................. | G06Q 20/3674 |
| 11,130,042 B2 * | 9/2021 | Tran | ...................... | A63B 71/145 |
| 11,348,098 B2 * | 5/2022 | Snow | ................. | H04L 9/0637 |
| 11,544,782 B2 * | 1/2023 | Cella | ...................... | G06Q 40/03 |
| 11,694,287 B2 * | 7/2023 | Marcinkowski | ...... | H04L 63/123 |
| | | | | 705/314 |
| 12,199,812 B2 * | 1/2025 | Pick | ........................ | H04L 41/16 |

(Continued)

*Primary Examiner* — Dylan C White
(74) *Attorney, Agent, or Firm* — Perkins Coie LLP

(57) ABSTRACT

Examples of the present disclosure describe systems and methods for monitoring services provided by a service provider to a consumer using a smart contract architecture. In one example, smart contract terms are provided to a DeFi application running on a blockchain, and a smart contract (e.g., a SLA smart contract) is constructed on the blockchain. Once the service provider begins providing service to the consumer, the system may monitor the service performance of the service. If the service performance dips below a certain agreed-upon threshold based on the smart contract, a trigger event may occur. Additionally, the analysis of the service performance data may indicate a service deficiency, wherein a remedial action is suggested to the service provider to be applied. The service deficiency and remedial action may be stored on the blockchain for future review.

20 Claims, 6 Drawing Sheets

(56) References Cited

U.S. PATENT DOCUMENTS

| | | | |
|---|---|---|---|
| 2002/0133328 A1* | 9/2002 | Bowman-Amuah | ......................... H04L 41/5032 703/22 |
| 2017/0287090 A1* | 10/2017 | Hunn | ....................... H04L 63/12 |
| 2018/0114205 A1* | 4/2018 | Thomas | .................. G06Q 40/02 |
| 2018/0174255 A1* | 6/2018 | Hunn | ..................... G06Q 50/18 |
| 2018/0268506 A1* | 9/2018 | Wodetzki | ............... G06N 5/046 |
| 2021/0192387 A1* | 6/2021 | Benson | .................. G06N 20/10 |
| 2021/0263909 A1* | 8/2021 | Paracha | .............. G06F 11/0751 |
| 2021/0374672 A1* | 12/2021 | Hunn | ......................... H04L 9/50 |
| 2022/0180333 A1* | 6/2022 | Kim | .................. G06Q 20/0655 |
| 2022/0253866 A1* | 8/2022 | Tedesco | ................... G06N 5/04 |
| 2023/0419304 A1* | 12/2023 | Cella | ........................ G06N 5/02 |

* cited by examiner

SYSTEMS AND METHODS FOR MONITORING SERVICES USING SMART CONTRACTS

TECHNICAL FIELD

The present disclosure relates to the fields of network monitoring, smart contracts, and blockchain systems.

BACKGROUND

Service-level agreements (SLAs) are usually negotiated and agreed upon between a service provider and a consumer. After the SLA is in force, the service is usually provided to the consumer. However, in many instances, a consumer will not receive the agreed-upon level of services from the service provider. For example, a consumer may have agreed to receive 500 Mbps Internet speed with an Internet Service Provider (ISP) but is only receiving 100 Mbps of Internet speed on most days. A typical SLA does not take into account this deficiency, but rather, the consumer is usually stuck paying a fixed price per month (or year) for the deficient service.

Additionally, from the service-provider perspective, the service-provider may want to uncover the root cause of the deficient service. Current methods typically require a technician to physically go to the location of the alleged deficient service, take an inventory of the hardware equipment, test the equipment, and then propose a solution. This process is not only time-consuming but also expensive and error-prone. As such, there is a need to more efficiently monitor services according to the terms of an SLA and recommend solutions to identified technical problems with the service delivery.

One facet of the present application is blockchain-based technology. A blockchain is a continuously growing list of records, called blocks, which are linked and secured using cryptography. Another name for a blockchain is a distributed shared ledger, which is an immutable database of records secured by cryptography. Each block may contain a hash pointer as a link to a previous block, a timestamp, and transactional data (e.g., each block may include many transactions). By design, a blockchain is inherently resistant to modification of the transactional data. A blockchain may be managed by a peer-to-peer network of nodes (e.g., devices) collectively adhering to a consensus protocol for validating new blocks. Once recorded, the transaction data in a given block cannot be altered retroactively without the alteration of all previous blocks, which requires collusion of a majority of the network nodes.

A blockchain is an append-only data structure maintained by a network of nodes that do not fully trust each other. A permissioned blockchain is a type of blockchain where access to the network of nodes is controlled in some manner, e.g., by a central authority and/or other nodes of the network. All nodes in a blockchain network agree on an ordered set of blocks, and each block may contain one or more transactions. Thus, a blockchain may be viewed as a log of ordered transactions. One particular type of blockchain (e.g., Bitcoin) stores coins as system states shared by all nodes of the network. Bitcoin-based nodes implement a simple replicated state machine model that moves coins from one node address to another node address, where each node may include many addresses. Furthermore, public blockchains may include full nodes, where a full node may include an entire transactional history (e.g., a log of transactions), and a node may not include the entire transactional history. For example, Bitcoin includes thousands of full nodes in all of the nodes that are connected to Bitcoin.

With the advent of decentralized blockchains came decentralized finance, or "DeFi." DeFi is an umbrella term for centralized permissionless financial infrastructure, wherein a variety of cryptocurrency-based financial applications operate. What makes these applications decentralized is that they are not managed by a central institution, but instead, the rules of these applications are written in code, and the code is open to the public for anyone to audit. These rules written in code are known as "smart contracts," which are programs running on a blockchain that execute automatically when certain conditions are met. DeFi applications are built using smart contracts. DeFi applications can be viewed as a cluster of second layer applications running on top of a blockchain.

Presently, ensuring that service providers are providing the agreed-upon service of an SLA is deficient in that consumers are typically locked-in to a fixed fee regardless of service quality. Further, when a service is alleged to be deficient by a consumer, identifying the technical issue and remedying it efficiently is problematic and usually requires manual technicians to visit a consumer's address, assess the hardware, and draw a conclusion. In some examples, one piece of hardware may be deficient, and if the one piece of hardware is left unchanged, other pieces of hardware necessary to deliver the service to a consumer may be damaged. Therefore, an increased need exists to ensure compliance with SLA terms and to more efficiently identify and remedy deficiencies with services delivered to a consumer.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
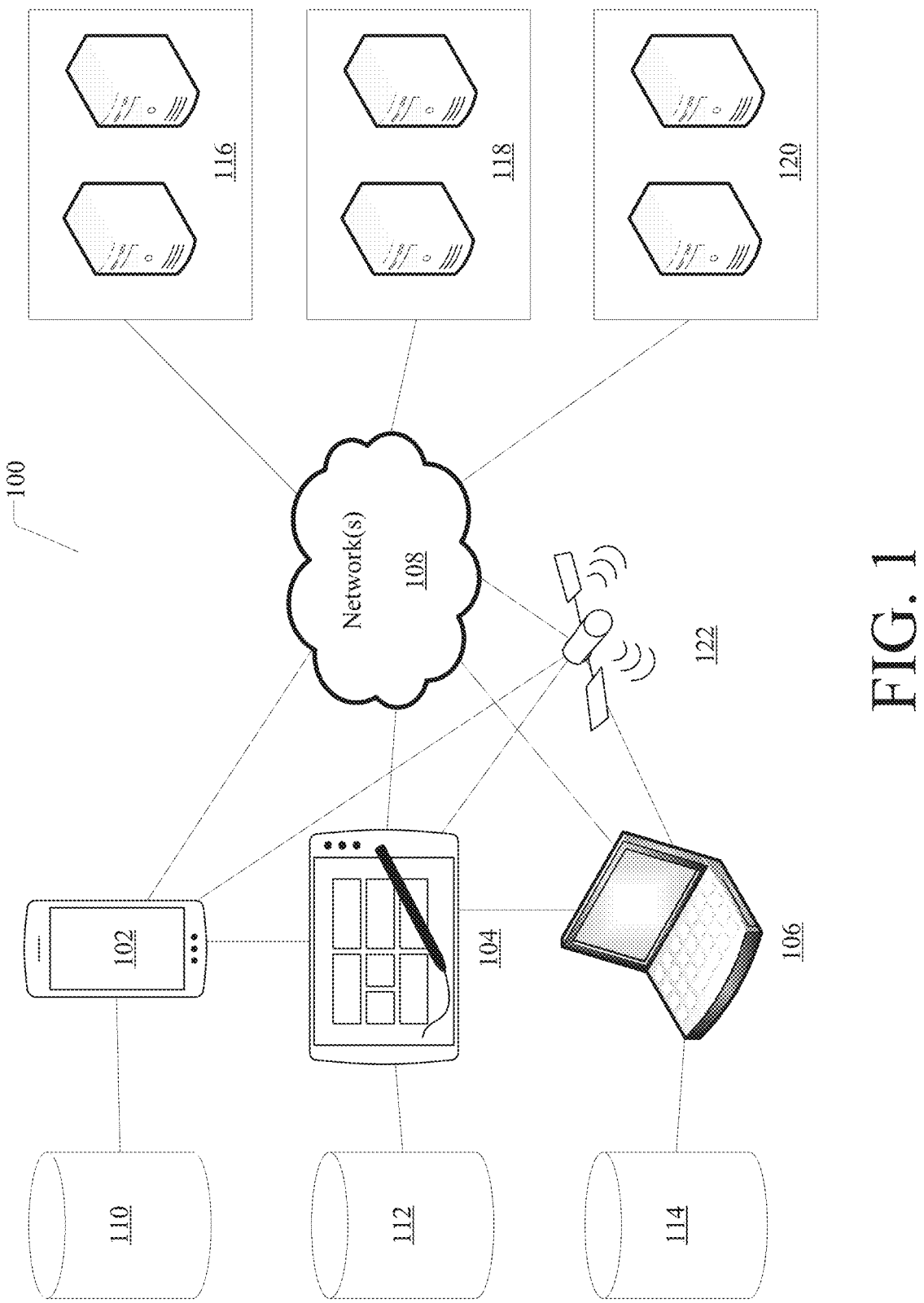
FIG. 1 illustrates an example of a distributed system for monitoring services according to an SLA smart contract.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed to systems and methods for monitoring services provided to a consumer according to terms (i.e., rules) in a smart contract. The monitoring of the services can comprise monitoring usage by a consumer, as well as the performance of the service. By monitoring the performance of the service, the service-provider may be able to better assess when a potential technological issue is present and how to remedy it. In some examples, the systems and methods described herein are implemented via a blockchain. Specifically, a smart contract may be negotiated between a consumer and a service provider. The smart contract may be in the form of a service-level agreement (SLA) that is self-executing based on the performance metrics of the service provided to the consumer. For instance, if the service consistently delivers a certain speed of Internet over a predetermined period of time, a certain option for a consumer to cancel the service without penalty may be automatically canceled based on the terms of the smart contract. In other instances, the smart contract may include program code that automatically transfers assets from the service provider to the consumer when the service performance is below the agreed-upon performance level per the SLA. This transfer of assets may be akin to a credit back to the consumer for poor service performance.

Additionally, certain reports regarding the service performance may be transmitted to at least one decentralized application running on top of the blockchain, where the service status reports are then appended to a blockchain and are immutable. Based on these status reports, certain terms of a smart contract may be triggered, and the service provider may be notified of potential technical problems with a particular service at a certain consumer location. By utilizing a blockchain to store service status reports, the systems and methods described herein can bring increased security and efficiency of network maintenance. For instance, the history of certain device configurations may be stored on the blockchain, so recovery after incidents may be straightforward in addition to identifying potential flaws or deficiencies in the hardware based on the device configuration history stored on the blockchain.

In one example, a service provider may provide terms of a smart contract to a DeFi application running on top of a blockchain. The terms may be agreed upon between the service provider and a consumer. In other examples, the consumer may transmit the terms of the smart contract to the DeFi application on the blockchain. Once the smart contract terms are received, a smart contract is constructed and written as a block to the blockchain. In some instances, the blockchain may be public, so that other consumers and service providers may audit and review the smart contract. In other instances, the blockchain may be private and/or permissioned, so that only certain service providers, consumers, and others may have access to read (and/or write to) the blockchain.

Once the smart contract is in place, the service provider may begin providing a service to the consumer. The service may be, for example, an Internet service, a broadcast service, a satellite television service, and/or an Internet-streaming service, etc. As the service is being provided to the consumer, service performance data may be collected and then transmitted back to at least one DeFi application operating on top of the blockchain. The application may receive the service performance data (e.g., in the form of a service status report) and write the performance data to the blockchain. As such, the service provider may be able to see the service performance data as it is written to the blockchain. By writing the service performance data to the blockchain, transparency regarding service performance is enhanced, as the blocks in the blockchain are immutable. Both the service provider and the consumer will be able to read this block in the blockchain, rather than the consumer having to blindly accept the service provider's word at face value.

Based on the service performance report, the system may analyze the service performance and compare the performance metrics against at least one term in the smart contract. If the metrics indicate that the service is operating at or above certain agreed-upon terms, then a smart contract trigger may occur that may render a certain provision of the smart contract obsolete (e.g., a consumer's ability to cancel a service after a predetermined amount of time if the service is not operating at or above a certain threshold). If the metrics indicate that the service is operating below the agreed-upon level, then the smart contract trigger may comprise a transfer of assets from a service provider wallet to a consumer wallet. This asset transfer may be considered a "credit" back to the consumer, since the consumer paid for a service that the consumer was not receiving.

In some examples, if a service performance deficiency is identified, the deficiency can be written to the blockchain, so that a history of the deficiencies can be maintained. Based on the nature of the system deficiency, the system may use at least one machine-learning model to determine a potential solution. The potential solution may be provided back to the service provider and, in some examples, deployed via the blockchain network (if the solution is software-based). Regardless of deployment medium, the solution that is carried out by the service provider may also be written to the blockchain, so a complete history of problem identification and applied solution may be recorded and utilized by future systems when solving network issues.

The present systems and methods offer a plurality of technical benefits. Specifically, the systems and methods herein are directed at improving service performance monitoring and identification of potential technical issues. By implementing a service monitoring system via a smart contract on a blockchain, certain actions are self-executing based on the terms of the smart contract. One such action is a service performance deficiency indicator that may be automatically triggered upon detection of a deficiency in the system. The deficiency may be automatically analyzed, and a solution may be proposed back to the service provider. Each of these steps may be performed without the service provider having to send a technician manually to the consumer location to analyze the systems in place, guess what the problem is, and propose a solution. Further, the systems and methods described herein improve network security and reliability by storing each recorded service performance status report, deficiency, and proposed solution to an immutable blockchain. As such, the transparency of a system's performance history is increased, and reviewing a system's health and performance is history is straightforward and accurate.

FIG. 1 illustrates an example of a distributed system for monitoring services according to an SLA smart contract. Example system 100 presented is a combination of interdependent components that interact to form an integrated whole for automatically transferring an asset based on a smart contract. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and/or 106 may be configured to receive and transmit data related to a service (e.g., Internet service, satellite television service, broadcast television service, Internet-streaming service, etc.). They may also be configured to communicate within a blockchain network, as well as host a copy of a blockchain locally in local databases 110, 112, and/or 114. On top of the blockchain may reside a DeFi application that the client devices 102, 104, and/or 106 are configured to run. In one example, a client device 102 may be a mobile phone, client device 104 may be a tablet, and client device 106 may be a laptop/personal computer. Other possible client devices include but are not limited to set-top boxes, Over-the-Air antennas, televisions (e.g., smart televisions), etc.

In some example aspects, client devices 102, 104, and/or 106 may be configured to communicate with a satellite, such as satellite 122. Satellite 122 may be a satellite (or multiple satellites) within a cellular system. Client devices 102, 104, and/or 106 may receive data via cellular protocols from satellite 122. The cellular data received by client devices 102, 104, and/or 106 may be stored local databases 110, 112, and/or 114. Additionally, such cellular data may be stored remotely at remote servers 116, 118, and/or 120. In other examples, client devices 102, 104, and/or 106 may be configured to communicate with one another via near-range communication protocols, such as Bluetooth.

Client devices 102, 104, and/or 106 may also be config-ured to run software that implements a blockchain with at least one DeFi application for receiving real-time service performance data, analyzing the service performance data, identifying potential deficiencies in the service system, and providing at least one solution based on a detected defi-ciency in the system. Furthermore, client devices 102, 104, and/or 106 may be configured to run software that monitors a service's health and performance and displays the current status of the service on the client devices.

For example, during initial setup, the consumer may provide certain access to the hardware devices running the service via client device(s) 102, 104, and/or 106. The system may then begin monitoring the service being delivered to the consumer in real-time. The service performance data may be stored remotely on server(s) 116, 118, and/or 120, and/or locally at databases 110, 112, and/or 114. The service performance data may be stored as a block on the block-chain. A service performance status report may be transmit-ted from a client device over network(s) 108 or satellite 122. Similarly, the system may automatically analyze the service performance data for deficiencies and, upon detection of a deficiency, write the deficiency to a block in the blockchain. The system may also store the deficiency in local and/or remote databases, as illustrated in FIG. 1. Additionally, a service performance solution may be transmitted to a service provider via network(s) and/or satellite 122. Subsequently, a service performance solution may be deployed back to the consumer's service system via network(s) 108 and/or satel-lite 122.

A smart contract (e.g., SLA between service provider and consumer) may also reside on the blockchain network. Copies of the smart contract may be stored locally at local databases 110, 112, and/or 114, as well as remotely at servers 116, 118, and/or 120. The smart contract may determine how the escrowed assets are transferred and to which entity. For example, the smart contract may be a smart contract between a consumer and a service provider. Based on the service performance delivered to the consumer, service performance reports may be periodically written to a blockchain. The service performance reports may indicate whether the ser-vice is meeting, exceeding, or underperforming the terms of the SLA. If the service performance report shows that the service is not performing up to the agreed-upon standards, then a smart contract trigger may occur, causing funds to be transmitted from a service provider wallet to a consumer wallet as a "credit" back to the consumer, since the con-sumer is not receiving the level of service the consumer paid for. Such a transfer of assets may also be written as a block to the blockchain.

Additionally, the service performance solution that is generated based on a determination of a service deficiency may be stored as a block in the blockchain. The service performance solution may be suggested to the service pro-vider based on the consumer's service performance data and at least one machine-learning model. At least one database of remediation options for service deficiencies and historical success rates of these remediation options may be accessed by client device(s) 102, 104, and/or 106 via network(s) 108 and/or satellite 122. The database(s) may also be stored locally at database(s) !10, 112, and/or 114.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmit-ting/receiving signals. For example, a user may use a mobile device 102 to query a blockchain to receive an update on the current status of a service. A graphical user interface may display on the mobile device 102 indicating the service status.

In other example aspects, devices 116, 118, and/or 120 may be databases that are utilized to provide an intelligent remediation action response for an identified deficiency in the system. For instance, one database may comprise his-torical remediation actions associated with similar services and environments. The similarity of the services and envi-ronments can be compared based on a straightforward audit of the service status reports written to the blockchain over time. Another database may comprise possible remediation action responses that can be deployed. Specifically, one database may match certain remediation actions based on the nature of the identified system deficiency. For example, an identified system deficiency associated with a software issue may require a software-based remediation action response that can be deployed via the blockchain network to the consumer's service infrastructure. Alternatively, if the identified system deficiency is hardware-based, a technician may be required to travel to the consumer location and service the deficient hardware in the system.

Figure 2:
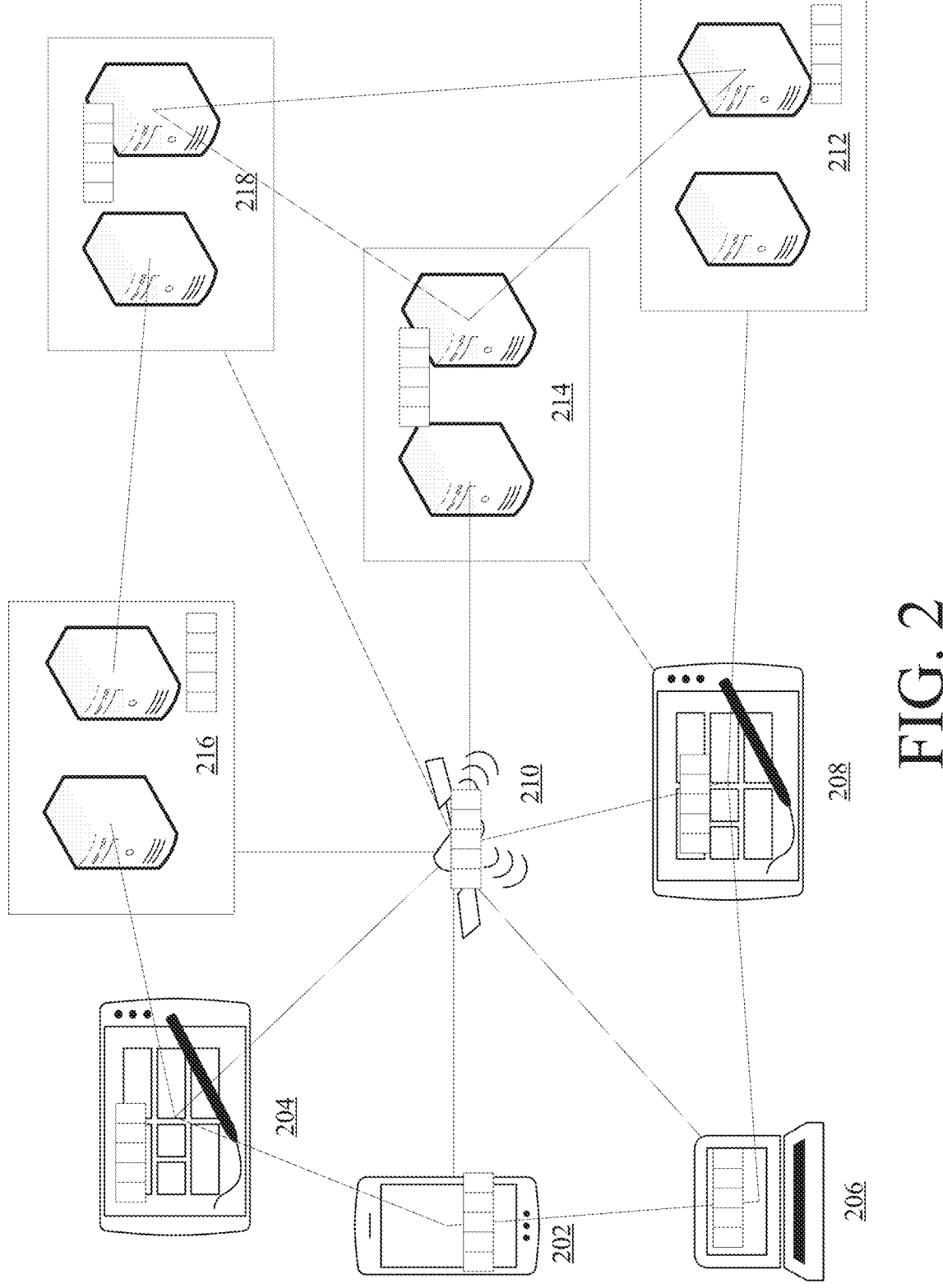
FIG. 2 illustrates an example distributed blockchain architecture for monitoring services according to an SLA smart contract.

FIG. 2 illustrates an example distributed blockchain archi-tecture for monitoring services according to an SLA smart contract. FIG. 2 is an alternative illustration of a distributed system like FIG. 1. In FIG. 2, each of the network devices are interconnected and communicate with one another. Each device in the network has a copy of the blockchain, as the blockchain is not controlled by any single entity but rather a distributed system, in some examples. In other examples, the blockchain may be a permissioned blockchain that includes an access-control layer, preventing and allowing some devices to read and write certain information to the blockchain.

Specifically, in FIG. 2, mobile device 202, tablets 204 and 208, laptop 206, satellite 210, and server nodes 212-218 are all connected and communicating with one each other in the blockchain network. Each node may store a local copy of the blockchain, or at least a portion of the blockchain. For example, laptop 206 may query the blockchain in the blockchain network, and server 214 may receive the query and produce a block from the copy of the blockchain that is stored on server 214. Laptop 206 may receive the information located within the block (e.g., service performance status report, service deficiencies, remediation actions, etc.). In short, the systems and methods described herein may be implemented within a distributed architecture as displayed in FIG. 2, and in some examples, implemented on a single node within the distributed blockchain network.

Figure 3:
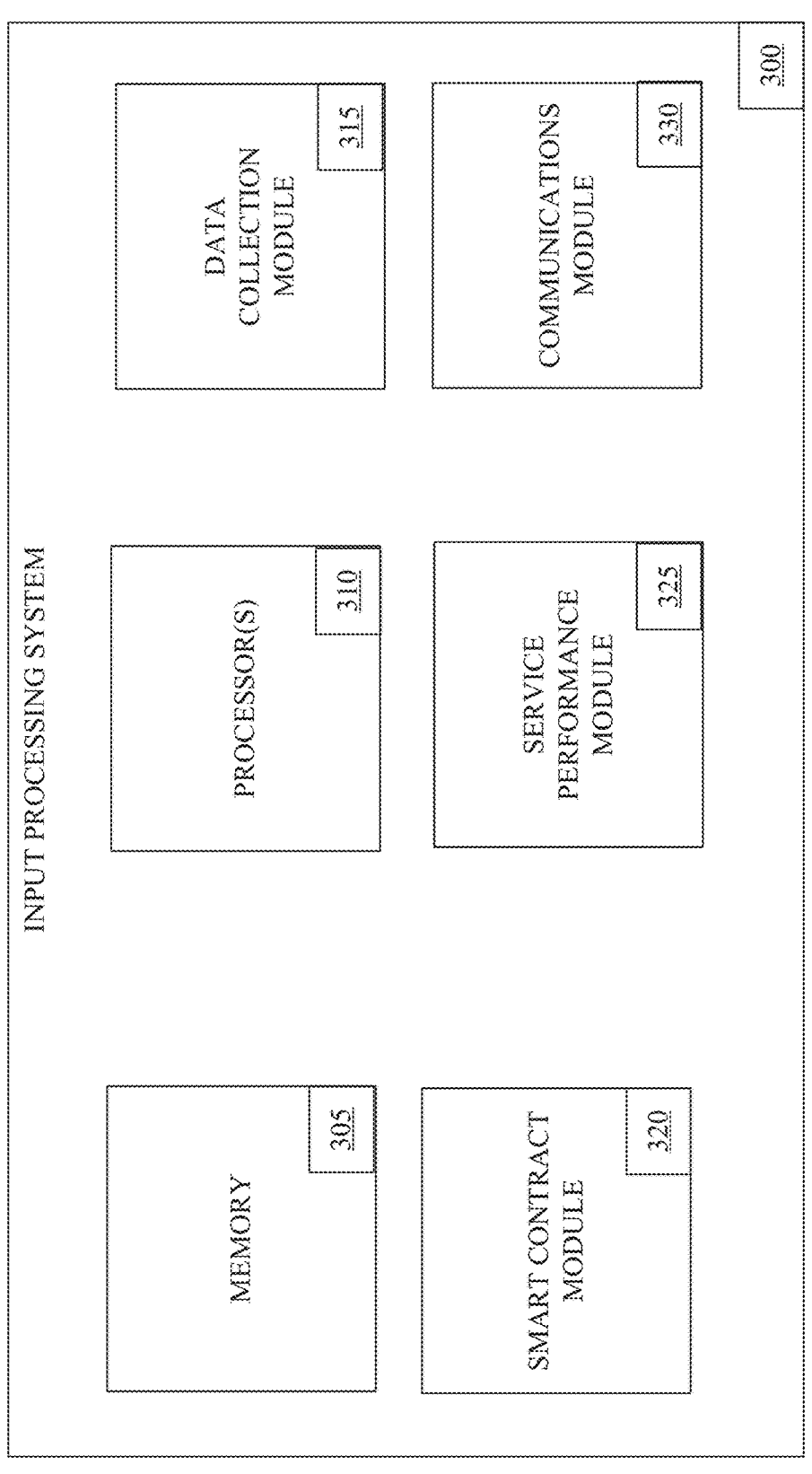
FIG. 3 illustrates an example input processing system for implementing systems and methods for monitoring services according to an SLA smart contract.

FIG. 3 illustrates an example input processing system for implementing systems and methods for monitoring services according to an SLA smart contract. The input processing system (e.g., one or more data processors) is capable of executing algorithms, software routines, and/or instructions based on processing data provided by a variety of sources related to verifying a device location. The input processing system can be a general-purpose computer or a dedicated, special-purpose computer. According to the embodiments shown in FIG. 3, the disclosed system can include memory 305, one or more processors 310, data collection module 315, smart contract module 320, service performance module 325, and communications module 330. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 305 can store instructions for running one or more applications or modules on processor(s) 310. For example, memory 305 could be used in one or more embodiments to house all or some of the instructions needed to execute the functionality of data collection module 315, smart contract module 320, service performance module 325, and communications module 330. Generally, memory 305 can include any device, mechanism, or populated data structure used for storing information, including a local copy of a blockchain data structure. In accordance with some embodiments of the present disclosures, memory 305 can encompass, but is not limited to, any type of volatile memory, nonvolatile memory, and dynamic memory. For example, memory 305 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 305. In some example aspects, memory 305 may store at least one database containing service performance data, historical service performance data, historical service deficiencies, historical remediation actions and their success rates, and presently available remediation actions to be deployed, etc. In other examples aspects, memory 305 may store at least one copy of a blockchain with at least one DeFi application running on the blockchain. In yet other example aspects, memory 305 may store assets (e.g., stablecoins) that may be submitted to a blockchain via a DeFi application. In other aspects, memory 305 may be configured to store at least one service performance status report. Any of the data, programs, and databases that may be stored in memory 305 may be applied to data collected by data collection module 315.

Data collection module 315 may be configured to collect data associated with at least one service performance. For instance, data collection module 315 may be configured to receive data associated with a consumer's usage of a service and the performance of that service over time. Such information may be received by data collection module 315 through client devices and/or trusted third-party sources. Data collection module 315 may also be configured to query at least one database associated with historical service performance data, including past issues with the service at a particular consumer location and remedial actions that were taken, along with their success rates at solving the past issues. Data collection module 315 may also be configured to receive real-time service status updates. For instance, in the context of providing an Internet service, real-time service status updates may comprise an assessment of bandwidth speed (e.g., how fast the Internet is able to upload and/or download data). In the context of an Internet-streaming multimedia service, real-time service status updates may indicate if a certain channel or channels are unavailable and for how long those channels are unavailable.

Alternately, data collection module 315 may interrogate, or otherwise solicit data from, one or more data sources comprising such information (e.g., service system hardware, such as televisions, set-top boxes, tablets, mobile phones, other nodes in the network, etc.). For example, data collection module 315 may have access to data in one or more external systems, such as content systems, distribution systems, marketing systems, user profiles or preference settings, authentication/authorization systems, device manifests, or the like. Specifically, data collection module 315 may have access to at least one database of historical service deficiency remedial action responses and up-to-date options for remediation actions based on detected service deficiencies, which may be organized according to the nature of the service deficiency. Data collection module 315 may use a set of APIs or similar interfaces to communicate requests to, and receive response data from, such data sources. In at least one example, the data collection process of data collection module 315 may be triggered according to a preset schedule, in response to a specific user request to collect data (e.g., user wants to know present status of service; service provider wants to know the nature of the identified service deficiency), or in response to the satisfaction of one or more criteria (e.g., service performance drops below agreed-upon threshold in SLA, so funds are automatically credited back to consumer from service provider). Data collection module 315 may also receive information from devices such as OTA boxes, set-top boxes, smart antennas (e.g., smart OTA antenna), televisions, smart televisions, and the like, which may include media content viewing history (which may inform the system described herein of the present service performance status).

Data collection module 315 may also be configured to receive data from service providers regarding service-provider contract terms. Such terms may be stored in data collection module 315 and passed to smart contract module 320 for construction of a smart contract.

Smart contract module 320 may be configured to receive data from data collection module 315. The data received by smart contract module 320 may allow the smart contract module 320 to construct at least one smart contract (e.g., a SLA smart contract) between a consumer and a service provider. For example, data received by the smart contract module 320 may be contract terms (i.e., rules) that the service provider requires for a service contract between the consumer and service provider. Specifically, a certain contract term may require that a certain level of service be provided to the consumer. In examples, the smart contract (operating via a DeFi application on top of a blockchain) may have access to a third-party application monitoring the use of a service by the consumer. Based on the information received from the use monitor application, asset transfer can be triggered automatically as a "credit" back to the consumer if the service performance falls below the agreed-upon threshold. In other examples, certain contract terms may be rendered void if service performance levels are maintained at the agreed-upon level. For instance, a certain term may allow the consumer to cancel the service without penalty at any time unless the service provided to the consumer consistently meets or exceeds the agreed-upon service level for the past 30 days. If 30 days have past, and the service performance indicators show the service has been provided to the consumer at or above the agreed-upon level, then the option for the consumer to cancel without penalty may be rendered void by the smart contract. This is a trigger event that may be written as a block to the blockchain to record the event.

In yet another example, smart contract module 320 may be configured to interact with service performance module 325, wherein the smart contract module 320 may create rules that trigger a transfer of assets or a voiding of certain contract terms based on the service performance deficiencies and remedies from service performance module 325. For instance, certain service performance data may be provided to smart contract module 320, triggering a certain clause in the smart contract (i.e., self-executing program code). The trigger event in smart contract module 320 may be provided to service performance module 325, where the trigger event is analyzed for any service deficiencies (i.e., if a service deficiency caused the trigger event). If a service deficiency is identified as the cause of the trigger event by service performance module 325, then service performance module 325 may generate at least one proposed remedial action for the service deficiency according to at least one database of historical service deficiencies and remedial actions and at least one machine-learning model applied to the service performance status report indicating the service deficiency. The proposed remedial solution may be provided first to the service provider for approval. If approved, the remedial solution may be deployed automatically over the blockchain network. In other examples, the proposed remedial solution may be automatically deployed without a second-level consent from the service provider (e.g., if the remedial action is a frequent remedial action proven to remedy the identified service deficiency).

Service performance module 325 may be configured to generate at least one proposed remedial action if a service deficiency is detected. To construct a proposed remedial action, performance module 325 may use at least one pattern recognizer. The pattern recognizer within service performance module 325 may be configured to identify and extract certain features from the identified service deficiency, such as duration of the deficiency, which piece of hardware in the system is at issue, any error statements, etc. Such data may be received by service performance module 325 from data collection module 315. These features regarding the service deficiency may be provided to at least one machine-learning model, where the machine-learning model identifies potential remedial actions to solve the deficiency. The output of service performance module 325 may be, for example, a list of possible remedial actions, ranked in order of historical success rate based on the machine-learning model.

In some aspects, the pattern recognizer within service performance module 325 may have two modes: a training mode and a processing mode. During the training mode, the pattern recognizer may previously identified service deficiencies and applied remedial actions to train one or more ML models. Once the one or more ML models are trained, the pattern recognizer may enter processing mode, where input data (e.g., service performance status reports) is compared against the trained ML models in the pattern recognizer. The pattern recognizer may then produce a confidence score that denotes the confidence of certain remedial actions actually solving the service deficiency, with a high confidence score being associated with a higher likelihood of the remedial action solving the deficiency and a low confidence score being associated with a lower likelihood of the remedial action solving the deficiency. For instance, service performance module 325 may suggest a certain remedial action with a high confidence score if the identified service deficiency is a common problem that has been observed and addressed previously in the system by the service provider. Alternatively, if the identified service deficiency is new, the service performance module 325 may suggest a remedial action with a lower confidence score, since the remedial action has not been tried and tested on similar service deficiencies in the past.

Service performance module 325 may be configured with at least one machine learning model. In some aspects, the extracted service deficiency features collected by data collection module 315 may be used to train at least one machine learning model associated with the pattern recognizer during training mode. For example, to train the machine learning model, the extracted and identified service performance features may be associated with certain deficiencies or certain normal operating indicators. The pattern recognizer of service performance module 325 may utilize various machine learning algorithms to train the machine learning model, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other machine learning algorithms. The aforementioned machine learning algorithms may also be applied when comparing input data to an already-trained machine learning model. Based on the identified and extracted service performance features and patterns, pattern recognizer may select the appropriate machine learning algorithm to apply to the service performance features to train the at least one machine learning model. For example, if the service performance features are complex and demonstrate non-linear relationships with an identified service deficiency (e.g., high Internet speed but one streaming channel in an Internet-streaming service is unavailable), then the pattern recognizer may select a bagging and random forest algorithm to train the machine learning model. However, if the service performance features demonstrate a linear relationship to certain service deficiencies (e.g., lower Internet speed is directly correlated with faulty fiber optic cables), then pattern recognizer may apply a linear or logistic regression algorithm to train the machine learning model.

In other aspects, service performance module 325 may apply at least one already-trained machine learning model to the received service performance features and patterns to detect previously identified deficiencies and applied remedial solutions. The pattern recognizer may be configured to compare at least one trained machine learning model to the service performance features to generate comparison results that indicate whether a certain service deficiency is low, medium, or high severity. Common and previously observed service deficiencies may be categorized as low severity, whereas new and previously unobserved service deficiencies may be categorized as high severity. The pattern recognizer may also be configured to generate comparison results that indicate the similarity (or lack thereof) between an identified service deficiency and past identified service deficiencies. Such comparison results will also aid service performance module 325 in selecting the most appropriate remedial action to apply to the service deficiency.

Communications module 330 is associated with sending/ receiving information (e.g., collected by data collection module 315, smart contract module 320, and service performance module 325) with a remote server or with one or more client devices, streaming devices, servers, OTA boxes, set-top boxes, smart televisions, etc. These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 330 sends information collected by data collection module 315 and processed by smart contract module 320 and service performance module 325. Furthermore, communications module 330 may be configured to communicate certain terms of a smart contract from smart contract module 320 and service deficiency remedial actions based on service performance module 325 to a client device. Additionally, communications module 330 may be configured to communicate an updated service performance status after, e.g., a remedial action is deployed to fix the service deficiency.

Figure 4:
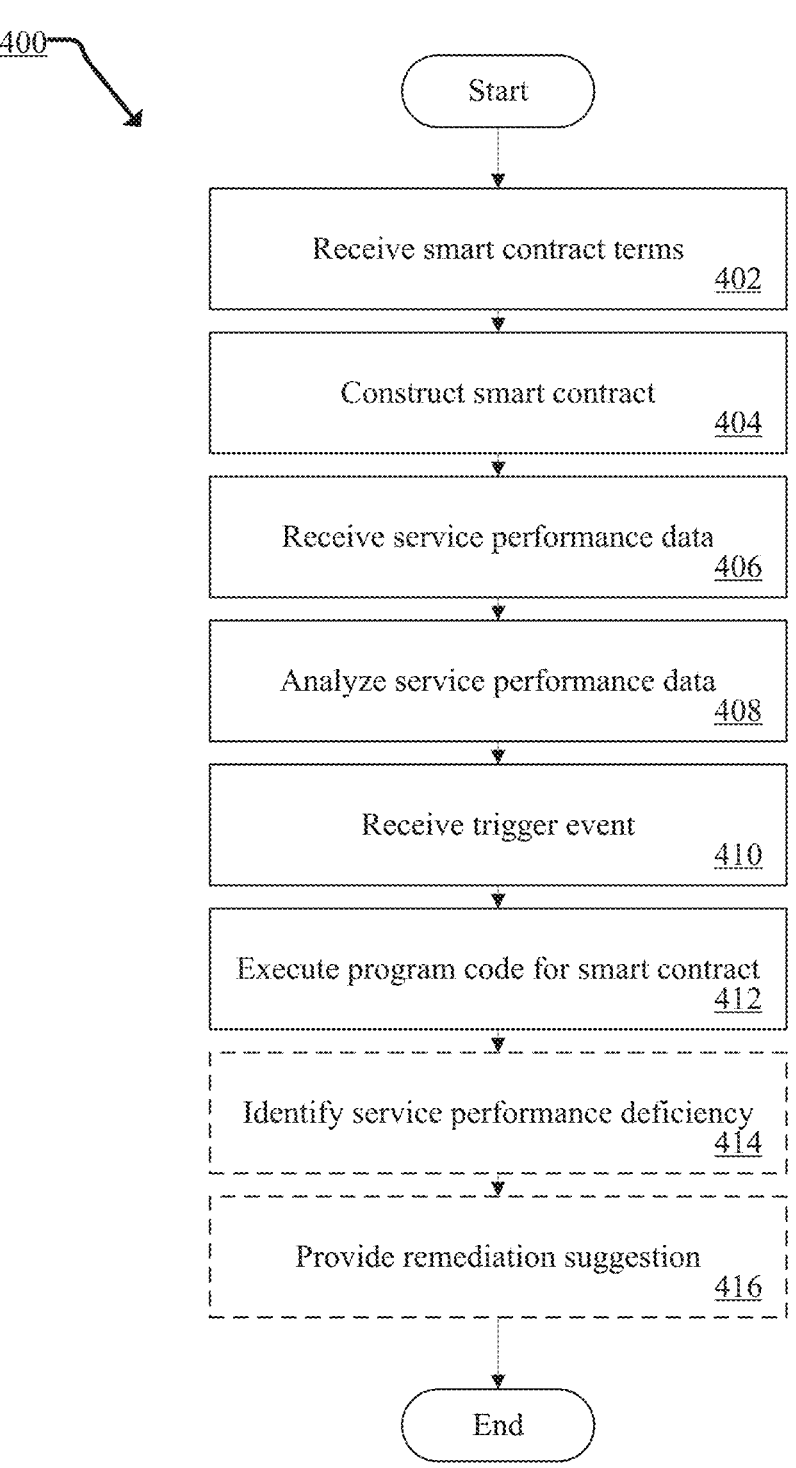
FIG. 4 illustrates an example method for monitoring services according to an SLA smart contract.

FIG. 4 illustrates an example method for monitoring services according to an SLA smart contract. Method 400 begins with step 402, receive smart contract terms. At step 402, the system may receive terms of a certain contract, such as a SLA contract between a service provider and a consumer. The terms may specify the price a consumer must pay to use the service. In some examples, the smart contract terms may be based on pay-per-bit or pay-per-time. Because the terms of the service-provider will be captured as a smart contract on a blockchain, an ongoing pay-per-use structure is feasible because the smart contract is self-executing. In a standard contract, if the payment structure was set up as a pay-per-use structure, then the remitting of payments and manual monitoring of services would have to occur as frequently as the terms specified. Even daily monitoring of such a manual contract would be infeasible and cumbersome for parties to execute. With a smart contract, however, the terms can be self-executing as frequently as the parties would like. For example, every 60 seconds, the system could monitor the use of the service by the consumer and, based on the amount of use, transfer assets from an escrow wallet (representing the assets deposited by the consumer) to a service provider wallet. No intermediaries (e.g., banks, financial institutions) are required.

Additionally, the terms of the smart contract may contain clauses regarding service performance metrics. If a service does not meet or exceed a certain performance metric, a smart contract rule may be triggered (e.g., service provider credits back to consumer a certain amount of money, i.e., cryptocurrency). If a service does meet or exceed certain thresholds based on the terms of the SLA, then other rules in the smart contract may be automatically triggered, such as a consumer-friendly cancel policy that is terminated after 30 consecutive days of the service meeting a predefined threshold.

Once the smart contract terms are received by the system at step 402, the smart contract may be constructed at step 404. Here, the smart contract may be automatically deployed on the blockchain according to the specified rules agreed to between the service provider and the consumer.

At step 406, service performance data is received. Service performance data may be received by each unit of hardware utilized in the system (e.g., router, cable box, smart television, modem, switch, mobile device, etc.). The service performance may be consistently monitored by the system, checking such indicators like speed (e.g., for Internet), channel availability (e.g., for satellite/broadcast television, Internet-streaming services), encryption levels, data usage, etc. Such performance data may be packaged into a status report and delivered periodically according to a preset time, e.g., agreed upon in the SLA smart contract. Each received status report, in some examples, can be written to the blockchain.

After the service performance data is received at step 406, the service performance data is analyzed at step 408. Here, the service performance data may be analyzed to check if there are any deficiencies. For example, if an error message is included in the service performance data, then the error message will be noted at step 408, which may prompt a triggering event (in step 410). In other examples, the analysis of the service performance data at step 408 may comprise comparing the performance data to certain smart contract terms. As discussed previously, certain service performance indicators may be compared to thresholds from the smart contracts (e.g., Internet bandwidth must be above 500 Mbps for 30 consecutive days for consumer cancel-anytime clause to terminate).

After the service performance data is analyzed at 408, a trigger event may be received by the system at step 410. The trigger event may be due to a comparison between the service performance indicators and smart contract rules. For example, if the SLA smart contract specified that the consumer would pay $X per month for access to 50 television channels, but the service performance indicators only show availability of 45 television channels for a certain period of time, the SLA smart contract may have an automatic trigger for reimbursing the consumer (e.g., transfer 10% of $X back to consumer because 10% of channels were unavailable). Generally, the smart contract triggers are based on a comparison between the smart contract rules and the service performance data received by the system.

Once the trigger event is received by the system at step 410, program code associated with the trigger and smart contract is executed at step 412. An example of an execution of program code could be an instruction that transfers assets from a service provider wallet to a consumer wallet based on a service deficiency (e.g., unavailability of a certain number of television shows, slow Internet speed, etc.). The executed program code at step 412 may be written to the blockchain.

Steps 414 and 416 are optional steps and are implicated when service deficiencies are detected. At step 414, a service deficiency is identified in the service performance data from step 406 and analyzed in step 408. For instance, an error message may be flagged in step 408, and the system may conclude this is associated with a service deficiency in step 414. Once the service performance deficiency is identified in step 414, the system may apply at least one machine-learning model to the service performance deficiency. The output of this analysis may be a suggested remedial action that is provided at step 416. The suggested remedial action may be supplied back to the service provider to consider and then permit to be applied to the system, or, in some examples, the remedial action may be suggested by the system and then automatically applied without further input by the service provider. The latter option may occur in cases where the identified service performance deficiency is a common and well-known service deficiency that has a track record of being solved by applying a particular remedial action. The provision of remedial actions to identified service performance deficiencies is described in further detail with respect to FIG. 3.

Figure 5:
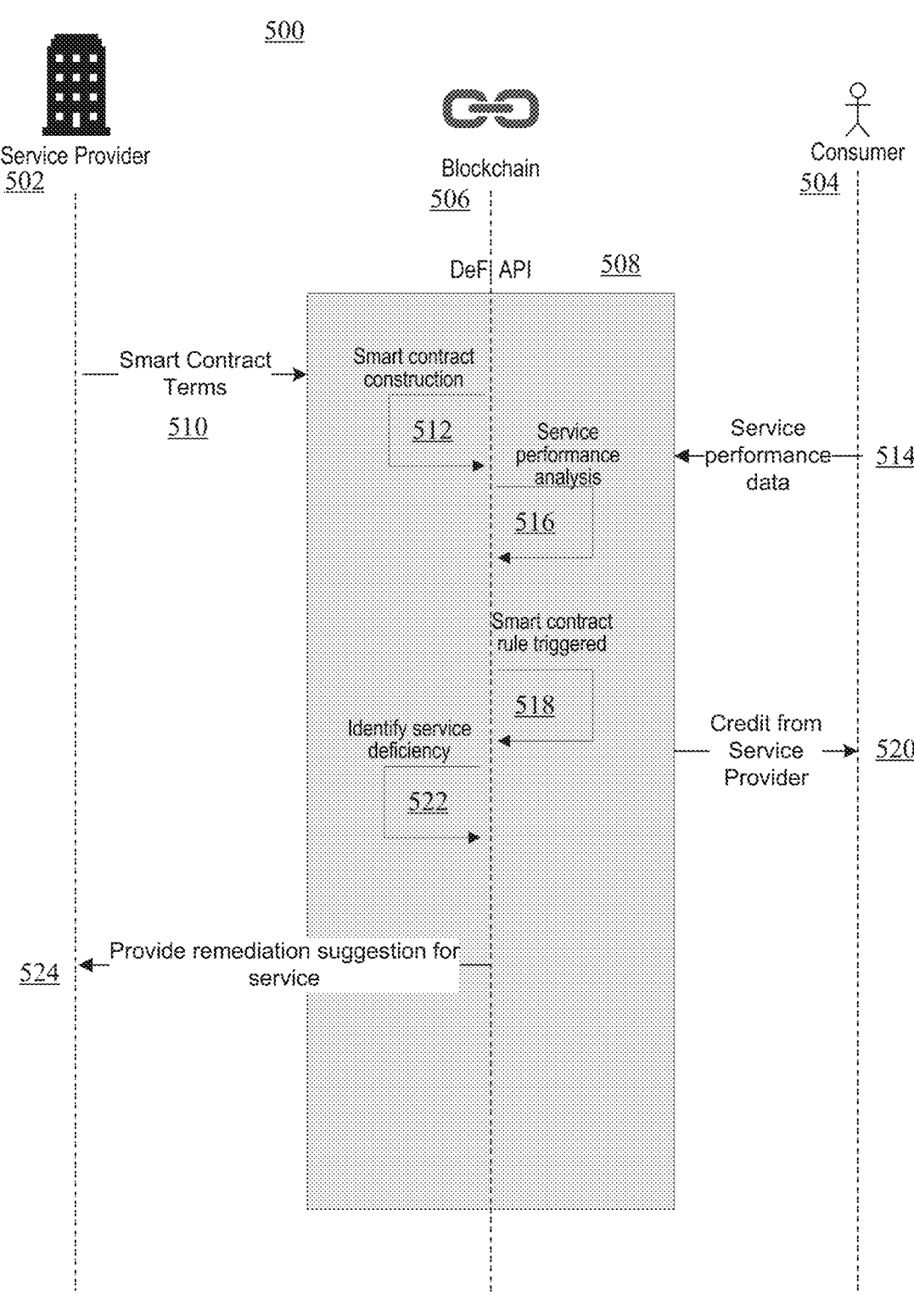
FIG. 5 illustrates an example monitoring process of a service delivered to a consumer according to a SLA smart contract.

FIG. 5 illustrates an example monitoring process of a service delivered to a consumer according to a SLA smart contract. FIG. 5 is similar to FIG. 4, in that the steps of FIG. 4 are displayed in FIG. 5 with the service provider 502, consumer 504, blockchain 506, and DeFi API 508 that operates on top of the blockchain 506. First, smart contract terms 510 are transmitted to the DeFi API 508. The terms may be received by at least one DeFi application and then written onto the blockchain. In some examples, the smart contract terms could be programmed directly to the block-chain 506 without a DeFi application intermediary. In other examples, the consumer 504 may transmit the smart contract terms. Regardless of which entity transmits the smart con-tract terms, once the terms are agreed upon, the smart contract is constructed and written as a block appended to blockchain 506, so that both service provider 502 and consumer 504 (as well as any other entity with read per-missions to the blockchain 506) can view and audit the smart contract.

After the smart contract 512 is in place, service provider 502 may begin providing services to consumer 504. The service performance data 514 may be captured and trans-mitted back to the blockchain from consumer 504. In examples, each hardware unit in the service system may be configured with a monitoring software that transmits the data back to the blockchain. In particular, the service per-formance data 514 may be transmitted first to a DeFi application via DeFi API 508, where the application receives the service performance data, analyzes the service perfor-mance data, and writes the service performance data to the blockchain 506 at 516. In some examples, the analysis of the service performance data may comprise constructing a ser-vice performance status report that is ultimately written to the blockchain. Specifically, a DeFi application could be configured to receive service performance monitoring data from a plurality of hardware units that are necessary for providing service to the consumer (e.g., modem, router, ethernet cables, fiber optic cables, etc.). Each of these hardware units may be configured to transmit service per-formance data to the DeFi application. The application may then consolidate this received data into a status report that is written to the blockchain at 516. The status report written to the blockchain may be viewable by the service provider 502.

Once the status report 516 is written to the blockchain, the system may compare the service performance data from the status report to the rules of the smart contract. The com-parison may cause a smart contract rule to trigger at 518. For example, a service performance indicator showing the ser-vice is operating below a certain agreed-upon threshold per the smart contract terms may trigger a rule that causes certain reimbursement funds to be transferred from a service provider wallet to a consumer wallet. The smart contract rule trigger event may be written to the blockchain at 518.

In the example where a service deficiency is identified and causes a smart contract trigger, one result of the rule trigger may be to transfer funds from the service provider to the consumer, which is illustrated at 520 in FIG. 5, where the service provider transmits funds to consumer 504. The funds may be in the form of dollars transferred from one checking account to another, or in some examples, the funds may be in the form of cryptocurrency that is transferred from one wallet to another wallet. In either scenario, the transfer of assets is recorded to the blockchain 506.

In conjunction with the credit being transferred from the service provider to the consumer, the system may also identify and analyze the service deficiency by applying at least one machine-learning model to the service deficiency and querying historical databases of service deficiencies and possible remediation actions. This analysis occurs at 522. The result of the analysis may be a remedial action sugges-tion that is provided to the service provider 502 at 524. The remedial action suggestion may be a historically-proven remedial action that has a high likelihood of solving the identified service deficiency. In other examples, the remedial action may have a lower likelihood of success due to the novel nature of an identified service deficiency. In further examples, the suggestion of the remedial action provided to service provider 502 may be skipped, and instead, the remedial action may be automatically deployed across the blockchain network (and the consumer's hardware devices). This action may occur in situations where the identified service deficiency is a common problem with a known solution, where the severity of the service deficiency is low, where network congestion is high, and the service provider 502 does not have the capacity to manually review the suggested remedial action, etc.

Figure 6:
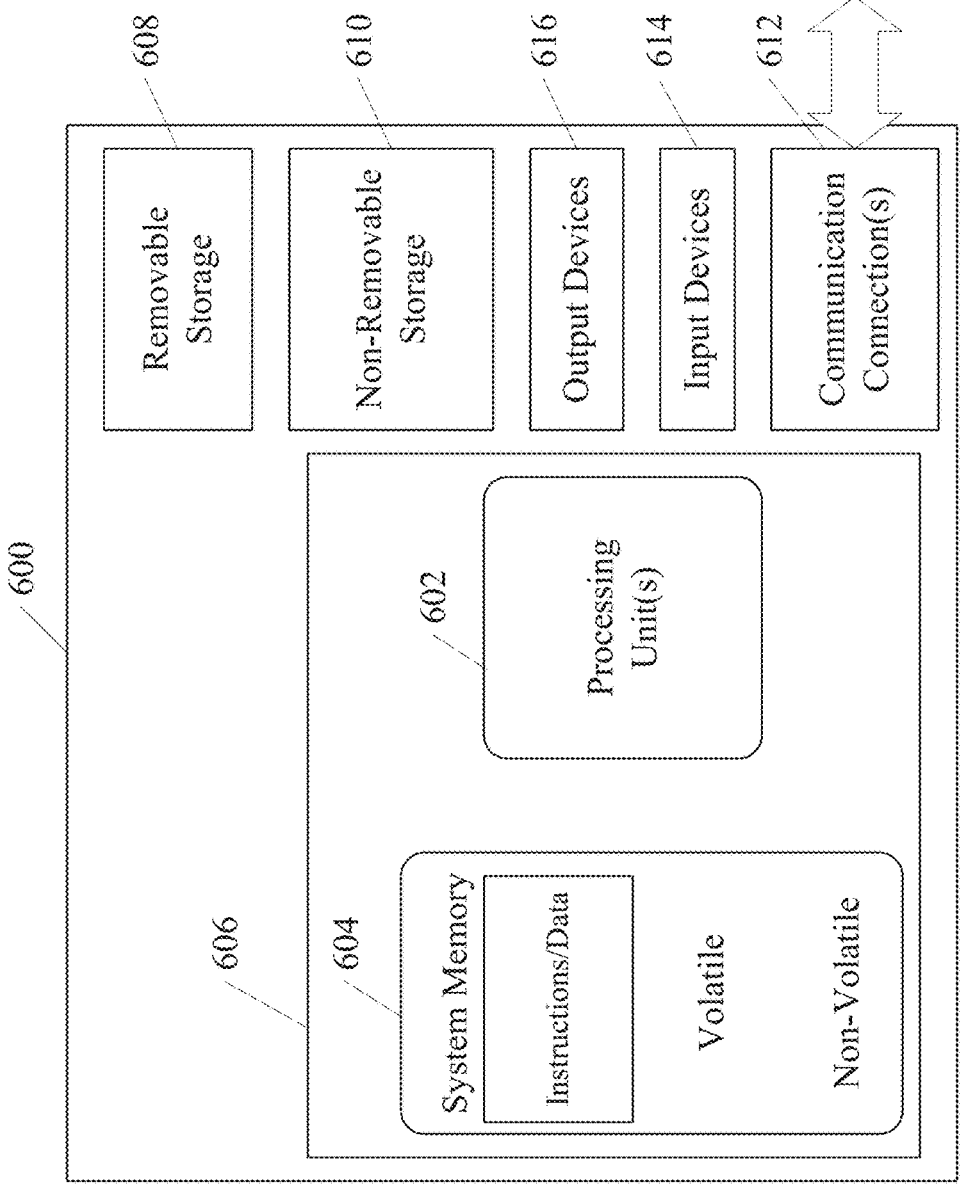
FIG. 6 illustrates one example of a suitable operating environment in which one or more of the present embodiments may be implemented.

FIG. 6 illustrates one example of a suitable operating environment in which one or more of the present embodi-ments may be implemented. This is only one example of a suitable operating environment and is not intended to sug-gest any limitation as to the scope of use or functionality. Other well-known computing systems, environments, and/or configurations that may be suitable for use include, but are not limited to, personal computers, server computers, hand-held or laptop devices, multiprocessor systems, micropro-cessor-based systems, programmable consumer electronics such as smart phones, network PCs, minicomputers, main-frame computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to devices, blockchain networks, service performance indicators, remedial actions, and instructions to perform the methods disclosed herein) may be volatile (such as RAM), nonvolatile (such as ROM, flash memory, etc.), or some combination of the two. This most basic configuration is illustrated in FIG. 6 by dashed line 606. Further, environment 600 may also include storage devices (removable 608 and/or non-removable 610) includ-ing, but not limited to, magnetic or optical disks or tape. Similarly, environment 600 may also have input device(s) 614 such as keyboard, mouse, pen, voice input, etc., and/or output device(s) 616 such as a display, speakers, printer, etc. Also included in the environment may be one or more communication connections, 612, such as Bluetooth, WiFi, WiMax, LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures (e.g., blockchains), program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 600 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A distributed system for monitoring services, comprising:
   at least one processor of a device; and
   a memory of a device and coupled to the at least one processor, the memory comprising computer executable instructions that, when executed by the at least one processor, perform a method comprising:
   receiving at least one contract term, wherein the at least one contract term is in the form of program code;
   constructing, on a blockchain, at least one smart contract based on the at least one contract term, wherein constructing the at least one smart contract includes identifying a service level and a threshold correspond to the service level, wherein the at least one smart contract is stored locally at the memory as well as remotely at a server;
   receiving service performance data associated with at least one service by a client device of the distributed system, wherein the service performance data is generated by a data collection module of the distributed system, wherein the at least one service includes a communication service, and wherein the service performance data is indicative of a communication quality of the communication service;
   analyzing the service performance data, wherein analyzing the service performance data comprises comparing the service performance data to the threshold;
   based on the analysis of the service performance data, determining a service location of at least one trigger event associated with the smart contract;
   identifying a potential issue at the service location in real time based on the at least one trigger event and the communication quality of the communication service, wherein the potential issue comprises identification of a channel availability, assessment of a bandwidth speed. or evaluation of historical service performance data associated with the service location;
   notifying, in real time, the service location of the at least one trigger event and the potential issue to a service provider; and
   providing a service performance solution to address the potential issue at least based on the service performance data.

2. The system of claim 1, the method further comprising:
   identifying at least one deficiency in the service performance data;
   analyzing the at least one deficiency in the service performance data by determining if one or more communication channels are available or unavailable for communication during a predetermined period of time; and based on the analysis of the at least one deficiency in the service performance data, providing at least one remediation action.

3. The system of claim 2, wherein analyzing the at least one deficiency in the service performance data further comprises analyzing at least one database of historical service performance deficiencies and remedial actions.

4. The system of claim 3, wherein analyzing the at least one deficiency in the service performance data further comprises applying at least one machine-learning model to the service performance data.

5. The system of claim 4, wherein the at least one machine-learning model is based in part on at least one of: a linear regression, a logistic regression, a linear discriminant analysis, a regression tree, a naive Bayes algorithm, a k-nearest neighbors algorithm, a learning vector quantization, a neural network, a support vector machines (SVM), and a random forest algorithm.

6. The system of claim 4, the method further comprising: training the at least one machine-learning model to categorize the at least one deficiency at least as one of: a hardware deficiency and a software deficiency.

7. The system of claim 4, the method further comprising: training the at least one machine-learning model to categorize the at least one deficiency at least as one of: a temporary deficiency and a permanent deficiency.

8. The system of claim 2, wherein providing the at least one remediation action further comprises deploying the at least one remediation action on the blockchain.

9. The system of claim 2, further comprising storing the at least one deficiency and the at least one remediation action on the blockchain.

10. The system of claim 2, wherein the at least one contract term comprises transferring a predetermined amount of assets from at least one service provider wallet to at least one consumer wallet based on the identification of the at least one service deficiency.

11. The system of claim 1, wherein the at least one service is at least one of: an Internet service, an Internet-streaming service, a television service, and a multimedia service.

12. The system of claim 1, wherein the at least one trigger event is received based on a determination that the service performance data is operating at or above at least one threshold according to the at least one smart contract term.

13. The system of claim 12, wherein the at least one contract term comprises voiding at least one cancel-anytime clause based on the service performance data operating at or above the at least one threshold.

14. The system of claim 1, wherein the at least one trigger event is received based on a determination that the service performance data is operating below at least one threshold according to the at least one smart contract term.

15. A computer-implemented method for monitoring service performance using at least one smart contract, comprising:

receiving at least one contract term, wherein the at least one contract term is in the form of program code;

constructing, on a blockchain, at least one smart contract based on the at least one contract term, wherein constructing the at least one smart contract includes identifying a service level and a threshold correspond to the service level, wherein the at least one smart contract is stored locally at a memory of a device of a distributed system as well as remotely at a server of the distributed system;

receiving service performance data associated with at least one service by a client device of the distributed system, wherein the service performance data is generated by a data collection module of the distributed system, wherein the at least one service includes a communication service, and wherein the service performance data is indicative of a communication quality of the communication service;

analyzing the service performance data, wherein analyzing the service performance data comprises comparing the service performance data to the threshold;

based on the analysis of the service performance data, identifying at least one service deficiency;

based on the identification of the at least one service deficiency, determining a service location of at least one trigger event associated with the smart contract;

identifying a potential issue at the service location in real time based on the at least one trigger event and the communication quality of the communication service, wherein the potential issue comprises identification of a channel availability, assessment of a bandwidth speed, or evaluation of historical service performance data associated with the service location; and notifying, in real time, the service location of the at least one trigger event and the potential issue to a service provider; and providing a service performance solution to address the potential issue at least based on the service performance data.

16. The method of claim 15, further comprising:

analyzing the at least one service deficiency by determining if one or more communication channels are available or unavailable for communication during a predetermined period of time; and based on the analysis of the at least one service deficiency, providing at least one remedial action.

17. The method of claim 16, wherein analyzing the at least one service deficiency further comprises applying at least one machine-learning model to the service performance data.

18. The method of claim 17, wherein the at least one machine-learning model is based in part on at least one of: a linear regression, a logistic regression, a linear discriminant analysis, a regression tree, a naive Bayes algorithm, a k-nearest neighbors algorithm, a learning vector quantization, a neural network, a support vector machines (SVM), and a random forest algorithm.

19. The method of claim 17, further comprising training the at least one machine-learning model to categorize the at least one deficiency at least as one of: a hardware deficiency, a software deficiency, a temporary deficiency, and a permanent deficiency.

20. A non-transitory computer-readable media storing computer executable instructions that when executed cause a computing system to perform a method comprising:

receiving at least one contract term, wherein the at least one contract term is in the form of program code and the at least one contract comprises transmitting a credit from a service provider to a consumer based on the identification of a service deficiency;

constructing, on a blockchain, at least one smart contract based on the at least one contract term, wherein constructing the at least one smart contract includes identifying a service level and a threshold corresponding to the service level, wherein the at least one smart contract is stored locally at a memory of a device of a distributed system as well as remotely at a server of the distributed system;

receiving service performance data associated with at least one service by a client device of the distributed system, wherein the service performance data is generated by a data collection module of the distributed system, wherein the at least one service includes a communication service, and wherein the service performance data is indicative of a communication quality of the communication service;

analyzing the service performance data, wherein analyzing the service performance data comprises comparing the service performance data to the threshold;

based on the analysis of the service performance data, identifying at least one service deficiency;

based on the identification of the at least one service deficiency, determining a service location of at least one trigger event associated with the smart contract;

identifying a potential issue at the service location in real time based on the at least one trigger event and the communication quality of the communication service, wherein the potential issue comprises identification of a channel availability, assessment of a bandwidth speed, or evaluation of historical service performance data associated with the service location;

notifying, in real time, the service location of the at least one trigger event and the potential issue to a service provider; and providing a service performance solution to address the potential issue at least based on the service performance data.

\* \* \* \* \*